United States Patent
Kilby et al.

(12) 
(10) Patent No.: US 6,589,693 B1
(45) Date of Patent: Jul. 8, 2003

(54) HIGH DISCHARGE ELECTROLYTIC MANGANESE DIOXIDE AND AN ELECTRODE AND ALKALINE CELL INCORPORATING THE SAME

(75) Inventors: David Kilby, North Olmsted, OH (US); Philip J. Slezak, North Ridgeville, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 41 days.

(21) Appl. No.: 09/593,898

(22) Filed: Jun. 14, 2000

Related U.S. Application Data

(60) Provisional application No. 60/147,364, filed on Aug. 5, 1999.

(51) Int. Cl.[7] .................................................. H01M 4/58
(52) U.S. Cl. ..................... 429/224; 429/218.1; 429/229; 429/231.8
(58) Field of Search ............................. 429/218.1, 224, 429/229, 231.8

(56) References Cited

U.S. PATENT DOCUMENTS

| | | | |
|---|---|---|---|
| 3,667,906 A | 6/1972 | Seiya | 23/145 |
| 4,285,913 A | 8/1981 | Soni | 423/50 |
| 4,489,043 A | * 12/1984 | Bowerman et al. | 423/49 |
| 4,549,943 A | * 10/1985 | Mellors | 205/352 |
| 5,534,234 A | 7/1996 | Reddin et al. | 423/50 |
| 5,698,176 A | * 12/1997 | Capparella et al. | 205/539 |
| 5,938,910 A | 8/1999 | Takehara et al. | 205/51 |

OTHER PUBLICATIONS

David LInden, "Handbook of Batteries," McGraw–Hill, Inc., 1985.*

Kao et al., "The influence of potassium ion on the electrodeposition and electrochemistry of electrolytic manganese dioxide," J. Electrochem. Soc., 139(5), 1223–6 (1992).*

Swinkels, D., "Production of Manganese Oxides–Production of EMD," *The Production, Characterisation and Utilization of Manganese Oxides in Batteries*, 1998.

Wen–Hong Kao, et al., "The Influence of Potassium Ion on the Electrodeposition and Electrochemistry of Electrolytic Manganese Dioxide," *J. Electrochem. Soc.*, vol. 139, No. 5, May 1992.

* cited by examiner

Primary Examiner—Carol Chaney
Assistant Examiner—Dah-Wei Yuan
(74) Attorney, Agent, or Firm—Russell H. Toye, Jr.; Robert W. Welsh

(57) ABSTRACT

An alkaline electrochemical cell is disclosed having a positive electrode, a negative electrode, and an electrolyte. The positive electrode comprises electrolytic manganese dioxide having a pH-voltage of at least about 0.860 volt. The electrolytic manganese dioxide also preferably has less than about 250 ppm and more preferably less than about 150 ppm of potassium impurities by weight. Electrolytic manganese dioxide having these properties exhibits significant synergistic and unexpected improvements in high-rate service, which translates to improved high-rate service life of the electrochemical cell containing the improved electrolytic manganese dioxide in its positive electrode.

17 Claims, 3 Drawing Sheets

HIGH DISCHARGE ELECTROLYTIC MANGANESE DIOXIDE AND AN ELECTRODE AND ALKALINE CELL INCORPORATING THE SAME

CROSS-REFERENCE TO RELATED APPLICATIONS

This application claims priority under 35 U.S.C. §119(e) on U.S. provisional patent application No. 60/147,364 entitled "HIGH DISCHARGE ELECTROLYTIC MANGANESE DIOXIDE FOR AN ELECTRODE OF AN ALKALINE ELECTROCHEMICAL CELL AND AN ELECTRODE AND ALKALINE CELL INCORPORATING THE SAME," filed on Aug. 5, 1999, the entire disclosure of which is incorporated herein by reference.

BACKGROUND OF THE INVENTION

The present invention generally relates to electrochemical cells. More specifically, the present invention relates to an improved electrolytic manganese dioxide (EMD) for an alkaline electrochemical cell.

Manufacturers of alkaline electrochemical cells are constantly attempting to increase the service life of the cells, and more particularly, the high-rate service life of their cells to meet the demands of current battery-operated devices, which draw increasingly larger current levels from the batteries. Because the outer dimensions of the battery are generally fixed by various standards, battery manufacturers cannot arbitrarily increase the outer dimensions of the battery in order to accommodate more of the electrochemically active materials in their batteries. Thus, substantial effort has been made to make more efficient use of the space provided in the interior of the battery so as to enable more electrochemically active materials to be contained inside of the battery. Such efforts have included minimizing the volume occupied by the current collector and seal that are contained inside of the battery as well as increasing the density of the electrochemically active materials at the expense of other component materials, such as electrolyte or conductive agents. Other efforts have focused on increasing the high-rate discharge efficiency by utilizing electrode constructions that optimize the interfacial surface area between the positive and negative electrodes. In addition, battery manufacturers have studied the electroactive materials themselves to increase their discharge efficiency. As will become apparent to those skilled in the art, the present invention addresses the latter approach through a discovery that leads to an increased high-rate discharge efficiency for EMD, which is the electrochemically active material commonly used in the positive electrode of an alkaline electrochemical cell. To better understand the present invention, a description is provided below of the manner by which EMD is commonly produced.

EMD that is suitable for use in an alkaline electrochemical cell generally includes about 92 percent manganese dioxide ($MnO_2$). A large percentage of the remainder of the EMD is $Mn_2O_3$. EMD additionally includes many different impurities at relatively low levels. Ideally, the EMD includes as high a percentage of $MnO_2$ as possible, to maximize cell service performance.

$MnO_2$ is a naturally occurring compound that is mined as an ore. The ore generally includes fairly high levels of impurities. The specific impurities and levels of impurities may vary considerably. Nevertheless, a typical analysis of a raw ore shows that it contains the following:

$MnO_2$—75 percent
Fe—3–4 percent
K—0.7–0.8 percent
Mo—15–20 ppm
Co—1200 ppm
Ni—600 ppm
$Al_2O_3$—6 percent
$SiO_2$—3 percent The raw ore is then processed through many different purification steps to arrive at a suitable form of EMD. The first step is a calcining process. The $MnO_2$ in the raw ore is insoluble in acid, which makes it difficult to further process the raw ore. Thus, the calcining process is used to convert the insoluble $MnO_2$ to manganese oxide (MnO), which is soluble in sulfuric acid. To produce the MnO (calcined ore), methane is used as a reagent in the presence of significant heat to cause the reduction of $MnO_2$ to MnO as shown in the formula below:

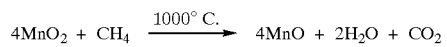

$$4MnO_2 + CH_4 \xrightarrow{1000°\ C.} 4MnO + 2H_2O + CO_2$$

A typical analysis of a calcined ore is:

MnO—60 percent
$MnO_2$—1–2 percent
Fe—3–4 percent
K—0.7–0.8 percent
Mo—15–20 ppm
CO—1200 ppm
Ni—600 ppm However, the levels of impurities can vary considerably, depending upon the raw ore.

The calcining process is typically carried out in brick-lined rotary kilns operated at about 1000° C. The calcined ore is then cooled and transferred to storage bins.

The next step in the process is known as the leaching process. There are several different leaching processes. One of the more common ones is known as the Jarosite process. In the Jarosite leaching process, the stored calcined ore is dissolved in sulfuric acid in order to remove iron (Fe) and potassium (K) impurities. The following reactions may take place in the leaching process:

$$MnO + H_2SO_4 \longrightarrow MnSO_4 + H_2O$$

$$FeO\ \{ore\} + H_2SO_4 \longrightarrow FeSO_4$$

$$2FeSO_4 + MnO_2 + 2H_2SO_4 \longrightarrow Fe_2(SO_4)_3 + MnSO_4 + H_2O$$

The leaching process generally takes place in one or more leach tanks. The initial pH in the leach tank is about 0.9. The calcined ore is added incrementally to slowly raise the pH to 4.2. As the pH rises, the mix undergoes the following reactions:

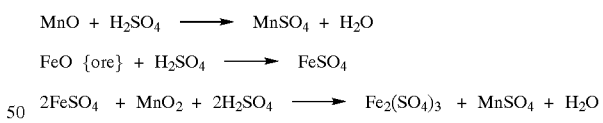

$$K_2SO_4 + 3Fe_2(SO_4)_3 + 12H_2O \xrightarrow{pH = 1.9} 2KFe_3(SO_4)_2(OH)_6 + 6H_2SO_4$$

$$Fe^{+2} + H_2O_2 \longrightarrow Fe^{+3} + H_2O$$

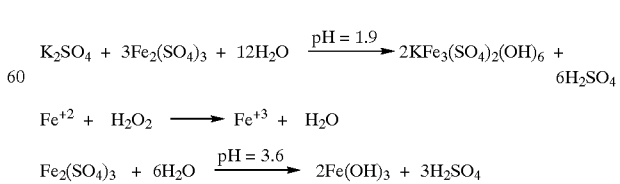

$$Fe_2(SO_4)_3 + 6H_2O \xrightarrow{pH = 3.6} 2Fe(OH)_3 + 3H_2SO_4$$

The first of the three above reactions is known as the Jarosite reaction. At the end of the leach bath, polymer may be added to the tanks to help settle suspended solids. These solids are then removed by filtering. The clear solution having the solids removed is then processed by the third step known as the sulfiding process.

The sulfiding process is typically performed in a holding tank. The sulfiding process is used to precipitate heavy metal impurities (M), such as molybdenum (Mo), cobalt (Co), and nickel (Ni). The solution that overflows from the filter in the leaching process is mixed with sodium hydrosulfide (NaSH). The NaSH is converted to $H_2S$, which then precipitates the impurities as sulfides. Thus, the solution undergoes the following reactions:

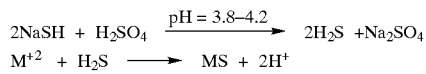

$$M^{+2} + H_2S \longrightarrow MS + 2H^+$$

The solid sulfides are then filtered out through two rotary vacuum drum filters. The filter material is diatomaceous earth. The resultant filtrate constitutes what is known as purified cell feed.

The cell feed is fed into one or more plating cells. Each plating cell may include many negative and positive plating electrodes. Each plating cell includes at least one negative and one positive electrode. Titanium is often used for the negative electrodes, and copper or lead can be used for the positive electrodes. Current flows through each cell to deposit the EMD on the negative electrode. Through this process, $MnO_2$ is plated onto the titanium negative electrode via the following reactions:

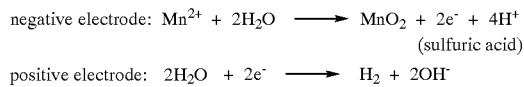

positive electrode: $2H_2O + 2e^- \longrightarrow H_2 + 2OH^-$

The cell bath is maintained at the desired temperature and acid concentration. The total process is a closed-loop system. The plating cells generate sulfuric acid and plate $MnO_2$ while the leach process consumes the sulfuric acid that is generated during the plating process and dissolves manganese.

After terminating the plating, the EMD is stripped off the negative electrode. The material is then ready for the finishing operation, which may include milling, washing and/or neutralizing. Washing and neutralizing may be done before, during or after milling. For example, in one finishing operation chunks of EMD are crushed to about ¾ inch (1.9 cm) average external diameter. This material is then sent to one or more neutralization tanks. In these tanks, an alkaline solution such as NaOH or KOH is used to increase the pH of the material to a predetermined level to meet finished product specifications. After the material is neutralized, it is milled and screened to the desired particle size distribution. The EMD is then ready for use in cell manufacture. The EMD may be first mixed with a conductive agent and impact-molded directly into the cylindrical can of the battery or may be mixed with a conductive agent and pre-molded into rings that may subsequently be inserted into the cell.

SUMMARY OF THE INVENTION

It is an aspect of the present invention to provide an electrochemical cell, specifically an alkaline electrochemical cell, having improved high-rate discharge properties. To achieve this and other aspects and advantages, the electrochemical cell according to the present invention comprises a negative electrode, an electrolyte, and a positive electrode comprising electrolytic manganese dioxide having a pH-voltage of at least about 0.860 volt. The high-rate discharge may further be improved by using electrolytic manganese dioxide having less than about 250 parts per million (ppm) of potassium impurities by weight.

These and other features, advantages, and objects of the present invention will be further understood and appreciated by those skilled in the art by reference to the following specification and claims.

DETAILED DESCRIPTION OF THE PREFERRED EMBODIMENT

An electrochemical cell constructed in accordance with the present invention comprises a negative electrode, a positive electrode, and an electrolyte. The cell may have essentially any construction. For example, the electrodes may have a bobbin-type, spiral-wound, stacked (i.e., jelly roll) or any other construction. The negative electrode preferably includes zinc or an alloy of zinc and the electrolyte preferably includes potassium hydroxide. The positive electrode comprises EMD and a conductive agent, such as graphite. The EMD has a pH-voltage of at least about 0.860 volt, and more preferably at least about 0.870 volt. The inventors have discovered that by maintaining the pH-voltage of the EMD to at least about 0.860 volt, the EMD, and hence the electrode and electrochemical cell, will provide improved high-rate service.

In addition, the EMD preferably has less than about 250 ppm of potassium impurities, more preferably less than about 200 ppm, still more preferably less than about 150 ppm, even more preferably less than about 75 ppm, and most preferably less than about 30 ppm of potassium impurities by weight. As used and defined herein, potassium impurities in the EMD is that potassium that is incorporated into the EMD crystalline structure, entrapped in voids in the EMD crystals or adsorbed onto the surface of the EMD crystals during plating, but does not include potassium added to the EMD after plating (e.g., from the neutralization process or from contact with other cathode or cell components). The inventors have also discovered that by insuring that the EMD has less than about 250 ppm of potassium impurities, the EMD and hence the electrode and electrochemical cell will provide improved high-rate service. The inventors have further discovered that an EMD having a pH-voltage of at least about 0.860 volt and less than about 250 ppm of potassium impurities, will exhibit surprising synergistic improvements in high-rate service.

Figure 1:
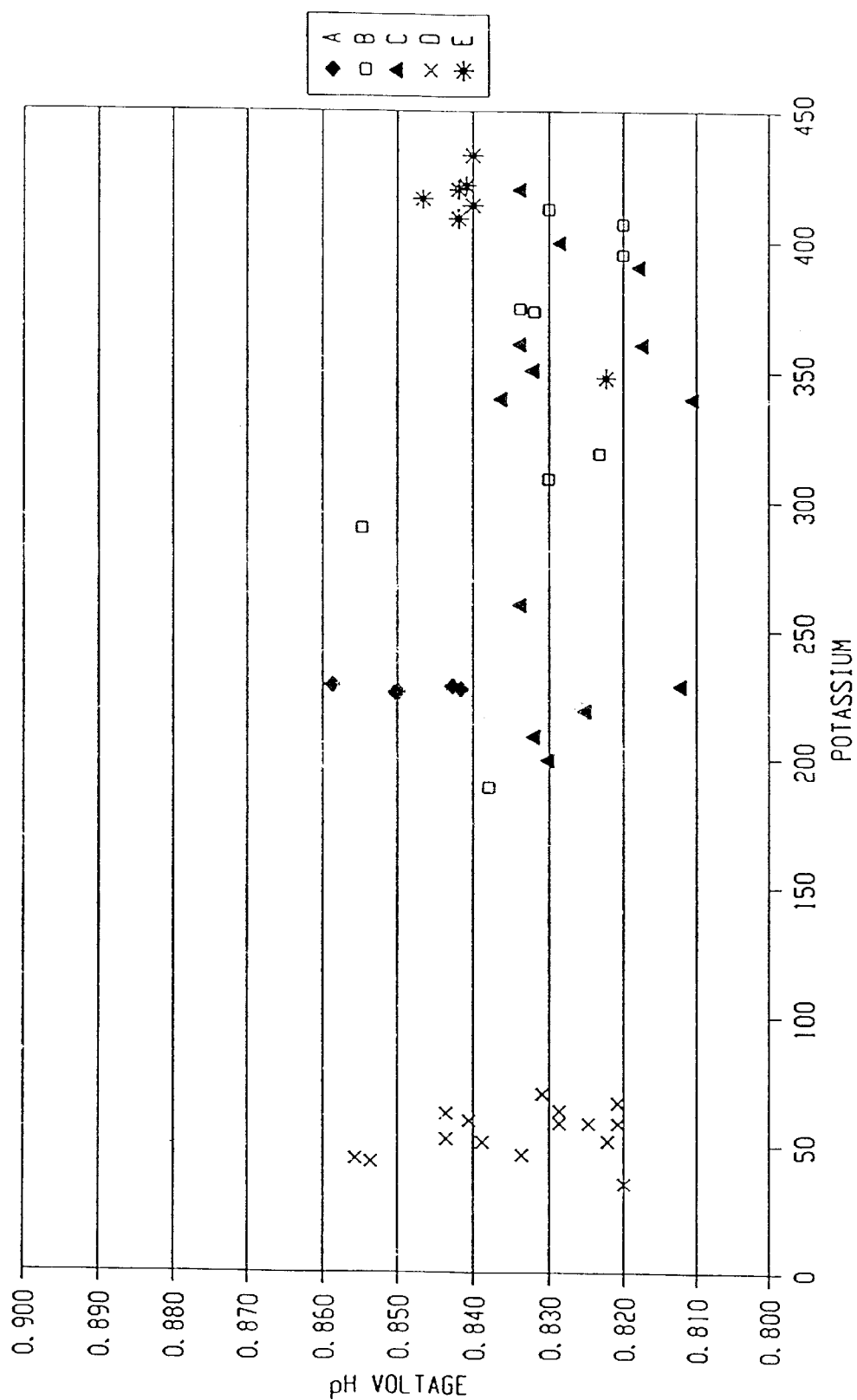
FIG. 1 is a plot of both the pH-voltage and potassium impurity levels of various samples of prior art EMD provided from five different suppliers.

FIG. 1 is a plot illustrating the measured pH-voltage (in volts) and potassium content (in parts per million by weight) of various EMD samples provided from five different suppliers. These values represent prior art EMD samples. As apparent from FIG. 1, current EMDs utilized in electrochemical cells have pH-voltages less than 0.860 volt. One commercially-available EMD has exhibited a potassium impurity level as low as 35 ppm, however this EMD has a pH-voltage below 0.860 volt.

While the above-noted process for producing WAD includes steps for removing potassium impurities and that can increase pH-voltage levels, those processes have never been utilized to further reduce the impurity levels of potassium or to further increase the pH-voltage of the EMD to the levels of the current invention for commercial use in electrochemical cell cathodes, especially for alkaline cells. For instance, the potassium impurity levels may be decreased by either staring with raw materials that do not have high staring levels of potassium impurities, by incorporating an effective potassium removal step of the plating bath cell feed in the EMD production process, or by refining or retreating the ore in the leaching process where potassium is removed during the Jarosite reaction. To increase the operative pH-voltage of the EMD, three approaches are known to be possible. The first optional process would be to alter the EMD plating conditions so as to maximize the rusultant EMD plate voltage (i.e., raise the acid level of the plating bath). The second process would be to chemically treat the EMD after plating process (i.e., acid wash the EMD). The third would be to preferentially select the material from the whole population of the EMD. While such processes are known for further decreasing potassium impurities and for further increasing the operating pH-voltage, EMD has not been produced meeting both of these criteria, because neither battery manufacturers nor producers of EMD had previously recognized the need for further reducing potassium impurities and increasing pH-voltage operating levels of the EMD.

As used and defined herein, the pH-voltage is the voltage measured with the EMD at a pH level of 6.0. The technique for measuring the pH-voltage is described below. This same technique is that which was utilized for measuring the pH-voltage of the cells constructed in the example that is also provided below. Also described below are the techniques for measuring the impurity levels of potassium in the EMD. It is noted that different test techniques may produce different results. The measurement techniques are therefore described below to provide the tests and basis for which one skilled in the art may determine whether a particular EMD falls within the scope of the claimed invention.

EXAMPLE

To illustrate the advantages of the present invention, eighty AA (LR6) size cells were made as follows. A cathode mix containing 85.31 weight % EMND, 5.69% expanded graphite, 7.4% 45%-KOH, and 1.6% water was blended in the following sequence. EMD and graphite were mixed, followed by the addition of the electrolyte and water. Mixing was continued. The mix was densified, and then broken up and screened through a 70 mesh screen. The densified and screened mix was placed into a AA size can with a graphite coating on its inside surface and impact molded to form a compacted cathode along the inside surface of the can. The resulting cathode had a height of 1.674 inches, a thickness of 0.158 inch, and a weight of 11.1 grams. Once molded, two pieces of separator having a length of 3.75 inches, a width of 0.680 inch, and a thickness of 0.004 inch were inserted into the cathode 90° of each other. An anode mix comprising 70 weight % Zn, 0.02% In(OH)$_3$, 0.42% carbopol, 1.17% 0.1 N KOH, and 28.39% 40%-KOH is made. A total of 6.05 grams of the resulting anode mix was placed inside of the separator along with 1.08 grams of 37%-KOH. An anode collector/seal assembly was then inserted and the cells were crimped. The cells were aged for one week and then discharged at either 1000 mA or 1500 mA. Service results were determined by the discharge time required for the cell to be discharged to a voltage of 1.0 V.

Twenty of the cells made in accordance with the above procedure contained an EMD having high potassium impurity levels (i.e., average impurity levels of 400 ppm) and low pH-V (i.e., average pH-V of 0.848 volt, resulting in a cell open circuit voltage of 1.603 volts). Twenty of the above cells contained an EMD having high potassium impurity levels and high pH-V (i.e., an average pH-V of 0.885 volt, resulting in a cell open circuit voltage of 1.622 volts). Twenty of the cells contained an EMD having low potassium impurity levels (i.e., average potassium impurity levels of 220 ppm) and low pH-V. The remainder of these cells contained an END having low potassium impurity levels and high pH-V. All the cells were then discharged to 1.0 V and the relative service (discharge time) of the cells was measured.

Figure 2:
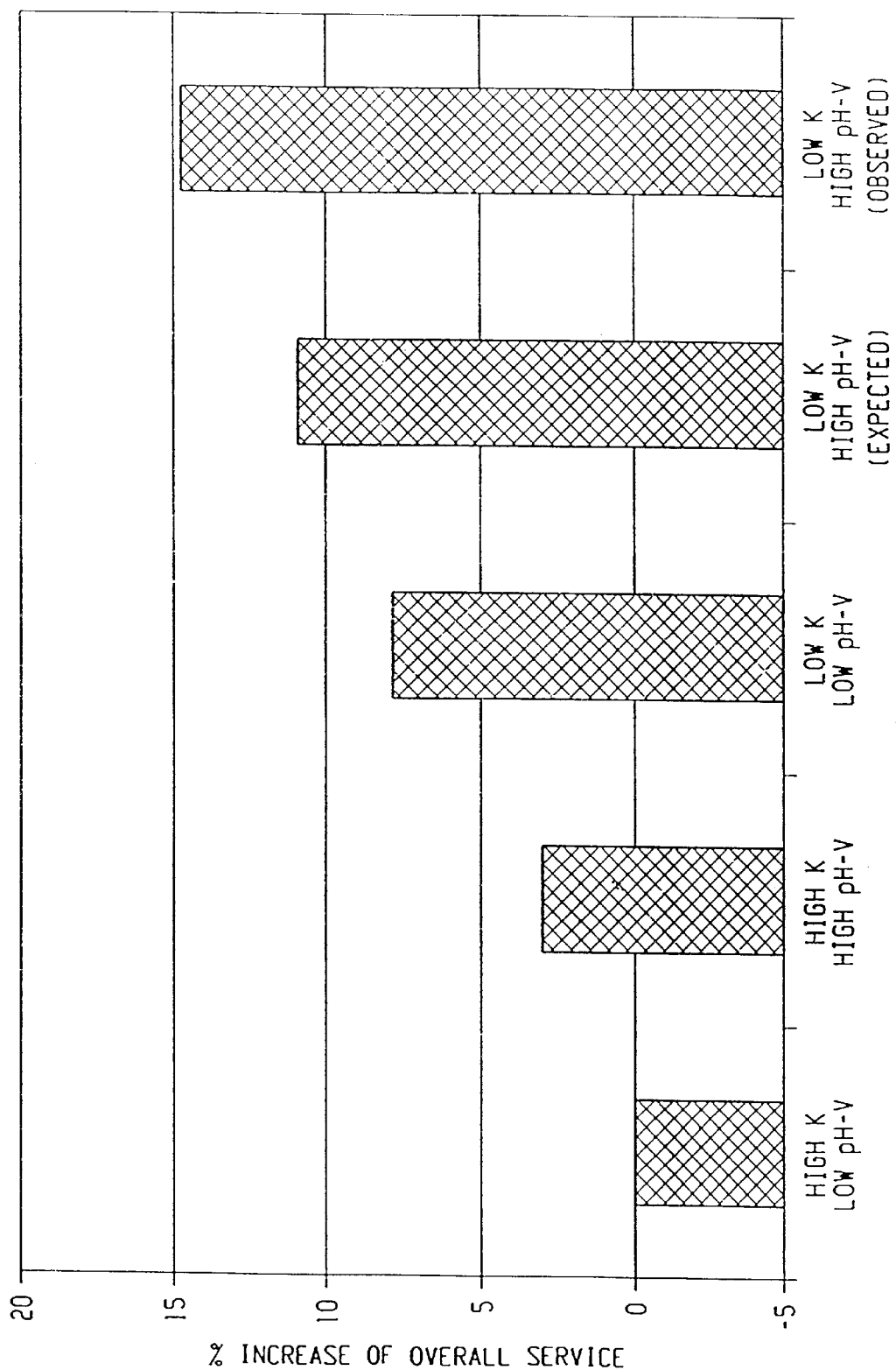
FIG. 2 is a bar graph illustrating the percent increase of overall service for cells constructed in accordance with the present invention as compared to the service of a conventional cell.

FIG. 2 is a graph illustrating the percentage increase of overall service based on 1500 mA and 1000 mA continuous service. As illustrated, the conventional cells, which had an EMD with high average potassium impurity levels and high average pH-V, served as the reference point from which the other three sets of cells were measured. Thus, for example, the cells having an EMD with high levels of potassium impurities and high pH-V exhibited approximately a 3% increase of overall service. Similarly, the cells with EMD having low pH-V and low potassium impurities exhibited about an 8% increase of overall service. Given a 3% increase of overall service for raising the pH-V level of the EMD and an 8% increase as a result of only lowering the potassium impurity levels in the EMD, one would expect to achieve about an 11% increase of overall service by forming a cell having both high pH-V and low potassium impurity levels. However, as illustrated in FIG. 2, the observed service data for such a cell exhibited an increase of overall service of approximately 15%. It is therefore apparent that the results of raising the pH-V of the EMD and lowering the potassium impurity levels in the EMD provides unexpected synergistic results.

The pH-V level of the EMD was measured using the technique described below. Further, the potassium impurity levels of the EMD was determined using the first two techniques described below for measuring potassium impurity levels. A third test for measuring potassium impurity levels is also provided, which enables the potassium impurity levels of the EMD to be measured for a cell that has already been manufactured.

1. Technique for Measuring pH-Voltage

To measure the pH-voltage of EMD, an electrically conductive mixture is first prepared by manually grinding 3 grams of fully neutralized EMD with 1.0 gram of graphite until the mixture will pass through a 200 mesh screen. (Note: mechanical grinding should not be used since it may generate enough heat to reduce the EMD.) A thin layer of electrically conductive mixture is spread on each of two rectangular pieces of cloth for each EMD sample to be tested. The pieces of cloth may be dense cotton, Pellon, or another synthetic material that is free of sizing material, or oxidizing reducing substances. The rectangular cloths are approximately ¾ inch (1.9 cm) by 3-inch (7.6 cm) rectangles. The electrically conductive mixture is pressed onto the cloth by firm horizontal strokes using a stainless steel spatula. One end of a 6-inch (15.2 cm) electrode is placed along one of the narrow ends of each coated cloth. The 6-inch (15.2 cm) electrode is a cylindrical carbon electrode (unimpregnated) with a 0.17–0.18 inch (0.43–0.48 cm) diameter. Each coated cloth is rolled onto one end of a carbon electrode as tightly as possible with the coated surface facing the carbon electrode. Each cloth is secured to a carbon electrode with a single size 8 rubber band, tightly stretched in three places across the cloth surface. Two #14 rubber stoppers are prepared by drilling through each of their centers a hole of a diameter sufficient for insertion of a Calomel reference electrode and one 0.185-inch to 0.19-inch (0.47 to 0.48 cm) diameter hole for each EMD sample to be tested (up to 12 holes spaced evenly about the perimeter of the stopper) to allow insertion of the carbon electrodes constructed in the manner discussed above. A #0 stopper is placed in the center hole of each #14 stopper until the reference electrode is to be inserted. One of each pair of carbon electrodes prepared as described above is inserted into each #14 stopper, with the wrapped end extending from the bottom of the stopper and a sufficient length of carbon electrode extending from the top for connecting a potential measuring cable.

Two solutions are prepared as follows and each is poured into a wide-mouth jar that holds approximately 473 ml, and is 92 mm high and 93 mm in diameter. Enough solution is poured into the jar to cover the cloth end of the carbon electrodes once they are inserted into the jars. Each jar is marked to identify the solution therein.

The first solution is made with 10.04 g of $ZnCl_2$, 24.50 g of $NH_4Cl$, 3.5 ml of $NH_4OH$, and 55.60 ml of de-ionized $H_2O$. This solution has an approximate pH of 5.8. The second solution is made with 10.00 g of $ZnCl_2$, 24.50 g of $NH_4Cl$, 11.00 ml of $NH_4OH$, and 55.60 ml of de-ionized $H_2O$. The second solution has an approximate pH of 6.9.

Once the two jars are filled with these two respective solutions, the stoppers containing the carbon electrodes are carefully placed into each of the two solutions. The assembly is allowed to stand 18 to 24 hours before reading potential and pH.

The potentials of the samples are first measured. The #0 stopper is removed from the center hole in the first jar, and a calomel reference electrode, attached to a multimeter, is inserted in this hole, using care to avoid disturbing the solution and the EMD samples. A 30-inch wire cable is also attached to the multimeter, and an alligator clip on the other end of the measuring cable is attached to one of the carbon electrodes. The potential in volts is then read from the multimeter. The alligator clip is then attached to other carbon electrodes in the stopper and the potentials read in the same manner. The multimeter must be one which will not discharge the sample. The multimeter used in the experiments described below was a Keithley 177 multimeter available from Keithley Instruments, Inc. of Cleveland, Ohio. Next, the calomel reference electrode is removed from the first jar, washed, dried, and carefully inserted into the stopper in the second jar, and the potentials of the electrodes in the second jar are read. After the potentials have been read, the #14 stoppers, with carbon electrodes, should be removed from both jars. The calomel reference electrode and a universal glass pH electrode are connected to a pH meter having a scale of 0–14 and then inserted into a 50 ml beaker containing pH-7 buffer solution to standardize the meter. The electrodes are then removed and rinsed with de-ionized water. After measuring the temperature of the solution in the first jar, these two electrodes are inserted into the first jar and the pH of the solution therein is read, adjusting the meter to compensate for temperature. Electrodes are rinsed, dried and inserted into the second jar to read the pH of the solution therein, adjusting the meter to compensate for temperature.

Figure 3:
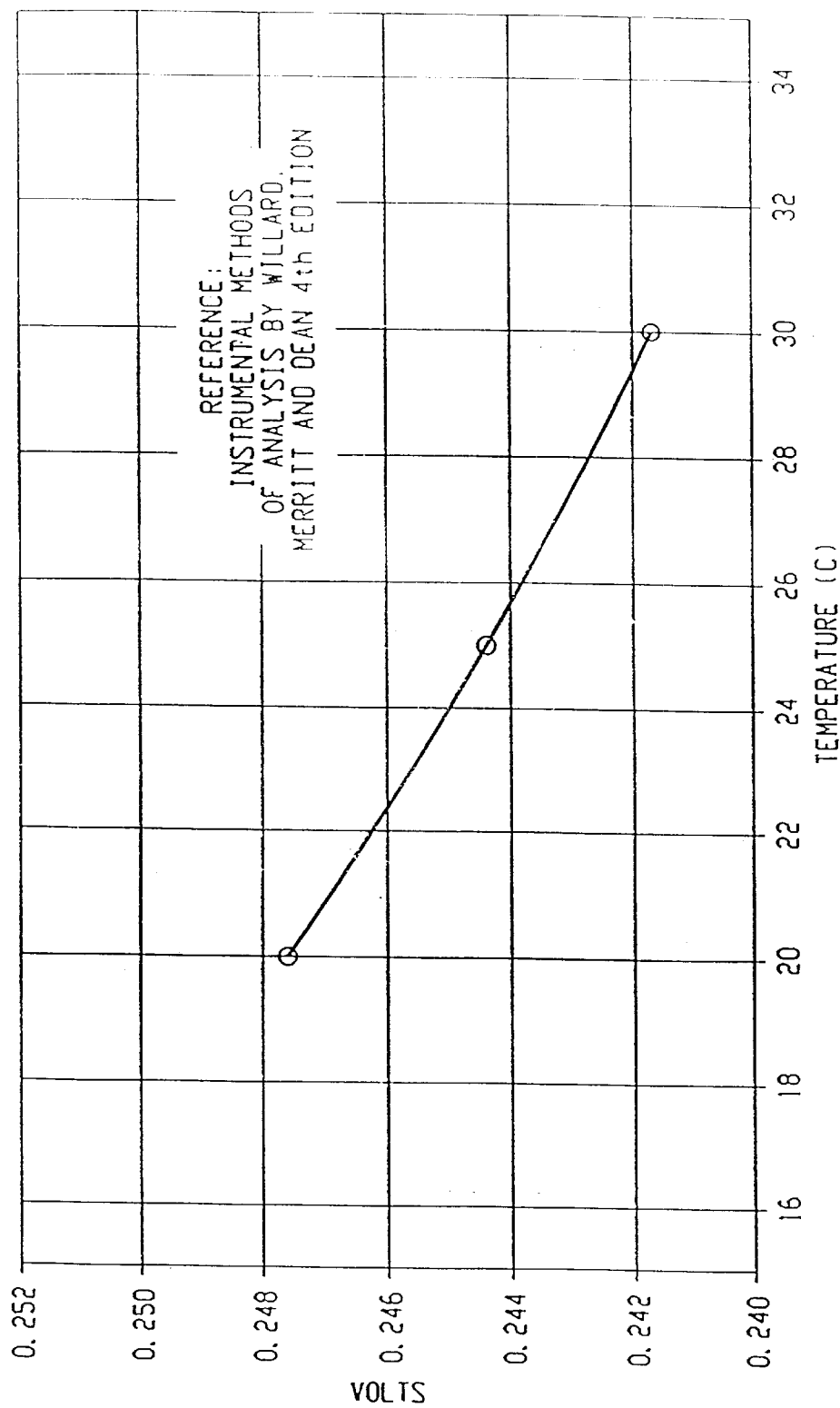
FIG. 3 is a graph of temperature vs. volts for determining temperature corrected potential values for converting potential readings from a calomel electrode to standard hydrogen electrode potential values.

To calculate the pH-voltage of the EMD sample, the potential values read versus the calomel electrode (SCE) are converted to potential values versus a standard hydrogen electrode (SHE) by adding the temperature corrected potential value from FIG. 3 to the potential values read from the pH meter. Next, the temperature corrected pH versus SHE potential is plotted on linear graph paper for both the first and second jars. The two plotted data points are then connected by a straight line and the potential at pH at 6.0 is read from the graph as the pH-voltage of the EMD sample.

2. Technique for Measuring Potassium Impurity Levels Greater than 150 ppm

The principle behind this test technique is that the EMD sample is dissolved in hydrochloric acid and the potassium level is determined by flame atomic absorption spectroscopy (FAAS) at 766.5 nm. In this test, there are three potential interferences that may skew the results obtained using this technique. The first of these interferences is that potassium is partially ionized in an air-acetylene flame. The effects of ionization may be substantially overcome by adding another alkali (1000–2000 µg/ml) to the samples and standards. A second interference is that manganese concentrations above 500 ppm suppress the potassium signal. Hydrochloric acid concentrations above 0.25% also suppress the signal.

The equipment used in this technique includes an atomic absorption spectrophotometer equipped with background correction; volumetric flasks of 1000 ml, 500 ml, 250 ml, 200 ml, and 100 ml; pipettes of 20.00 ml, 10.00 ml, and 2.00 ml; burettes of 50 ml and 25 ml; Carboy-Nalgene, 5½ gallon with spigot from the 1998 Fisher Scientific Catalog #02 963 BB; a fume hood; beakers of 150 ml; and watch glasses to fit the 150 ml beakers.

Additionally, the following reagents are used in this technique:

1. De-ionized water. Fill a 5½ gallon-Nalgene carboy with de-ionized water and let it adjust overnight to room temperature. Use this water to dilute all samples and standards. Also allow other solutions for sample preparation/measurement to adjust to the same temperature by placing them in proximity to this source of de-ionized water, preferably hours before use.

2. Hydrochloric acid-concentrated, reagent grade.

3. Sodium-Chloride Buffer Solution, 15,000 µg/ml-allot 38.13 grams of an ACS or finer grade of sodium chloride to a 1000-ml volumetric flask. Allow mixture of NaCl and water to adjust to room temperature, then dilute to the mark with de-ionized water and mix well. Reserve for dispensing with a 50-ml burette.

4. 1,000 µg/ml Potassium Reference Solution—Fisher Scientific Catalog #PLK2-2X. Solute: Potassium Chloride. Solvent: Distilled Water.

5. 10.00 µg/ml Potassium Stock Solution—Pipette 10 mls from the 1000 µg/ml potassium reference solution into a 1000-ml volumetric flask. Dilute to the mark with de-ionized water and mix well. Reserve for dispensing with a 50-ml burette.

6. 2.00 µg/ml Potassium Stock Solution—Dispense 50 mls from the 10.00 µg/ml potassium stock solution into a 250-ml volumetric flask. Dilute to the mark with de-ionized water and mix well.

The following range of working standards are prepared with the following concentrations, as needed:

1. 2.00 µg/ml Potassium—Dispense 40 ml of the 10.00 µg/ml potassium stock solution into a 200-ml volumetric flask. Add 20 ml of the sodium chloride buffer solution. Dilute to the mark with de-ionized water and mix well.
2. 1.50 µg/ml Potassium—Dispense 30 ml of the 10.00 µg/ml potassium stock solution into a 200-ml volumetric flask. Add 20 ml of the sodium chloride buffer solution. Dilute to the mark with de-ionized water and mix well.
3. 1.00 µg/ml Potassium—Dispense 20 ml of the 10.00 µg/ml potassium stock solution into a 200-ml volumetric flask. Add 20 ml of the sodium chloride buffer solution. Dilute to the mark with de-ionized water and mix well.
4. 0.50 µg/ml Potassium—Dispense 10 ml from the 10.00 µg/ml potassium stock solution into a 200-ml volumetric flask. Add 20 ml of the sodium chloride buffer solution. Dilute to the mark with de-ionized water and mix well.
5. 0.25 µg/ml Potassium-Dispense 25 ml of the 2.00 µg/ml potassium stock solution into a 200-ml volumetric flask. Add 20 ml of the sodium chloride buffer solution. Dilute to the mark with de-ionized water and mix well.
6. 0.10 µg/ml Potassium—Dispense 10 ml of the 2.00 µg/ml potassium stock solution into a 200-ml volumetric flask. Add 20 ml of the sodium chloride buffer solution. Dilute to the mark with de-ionized water and mix well.
7. 0.05 µg/ml Potassium—Dispense 5 ml of the 2.00 µg/ml potassium stock solution into a 200 ml volumetric flask. Add 20 ml of the sodium chloride buffer solution. Dilute to the mark with de-ionized water and mix well.

The procedure includes the following steps:

1. Determine (by weight loss after 4 hours at 120° C.) the moisture on approximately 10 grams of the EMD sample and use this value in calculating the potassium concentration.
2. Weigh 3.0000 grams of EMD, place into a 150-ml beaker, and cover with a watch glass. Transfer to a fume hood and add 15 mls of concentrated hydrochloric acid slowly down the side walls of the beaker. Allow it to stand until foaming subsides; swirl gently from time to time until mixture reacts only mildly.
3. Transfer a second 150-ml beaker to the fume hood, add 15 mls of hydrochloric acid, and cover with a watch glass. This is a reagent blank and should be carried through the entire procedure.
4. Place the EMD sample and reagent blank on a hot plate and heat slowly until the EMD sample solution clears and the $MnO_2$ has dissolved completely. Heat the reagent blank until the HCl volume has been reduced to less than 4 mls. Remove both from the hot plate and allow them to cool for at least 5 minutes. Then rinse watch glasses and side walls of the beakers with de-ionized water from a wash bottle. Replace the watch glasses and swirl contents gently. Adjust the volume of solution in the beakers to about 75 mls and let cool to room temperature.
5. Filter the sample and reagent blank, with the aid of a clean stirring rod, through 540-Whatman filter paper into separate 500-ml volumetric flasks. Wash the residues with de-ionized water from a wash bottle at least ten times, allowing the filters to drain after each washing. Dilute to the mark with de-ionized water. Mix well.
6. Pipette 10.00 ml of the EMD sample and the blank into separate 100-ml volumetric flasks. Add 10 ml of the sodium chloride buffer solution to each and dilute to the mark with de-ionized water and mix well.
7. Peak the wavelength on the AA spectrophotometer near 766.5 nm, with the slit set at an opening of 1.4 nm. Aspirate standards 1 through 7 into an oxidizing (lean, blue) flame, followed by reagent blank and EMD samples from step 6.
8. Construct a calibration graph of absorbance versus concentration of standards in (µg/ml K) on linear graph paper. Read each sample concentration from the graph in (µg/ml) for each corresponding absorbance value. Insert the concentration value (µg/ml) in the equation below for calculations of potassium impurity levels of the EMD sample.

It should be noted that if any EMD sample reading is above the highest standard (i.e., the 2.00 mg/ml potassium working standard), dilute it to bring it in the proper range. If any sample reading is below the lowest standard (i.e., 0.05 mg/ml potassium working standard), this method cannot be used to analyze that sample.

The potassium in ppm is then calculated as follows:

$$\text{Adjusted Sample Wt.} = \text{Actual Sample Wt. (Step 2)} \times [(100\% - \% \text{moisture}) \div 100] \quad 1.$$

$$\text{Corrected } \mu g/ml \text{ K} = \mu g/ml \text{ K for sample} - \mu g/ml \text{ K for reagent blank} \quad 2.$$

$$\text{Potassium, ppm} = \frac{\text{Corrected } \mu g/ml \text{ K} \times 100 \text{ ml} \times (500 \text{ ml} \div 10 \text{ ml})}{\text{Adjusted Sample Wt., grams}} \quad 3.$$

3. Technique for Measuring Potassium Impurity Levels Less than 150 ppm

The principle behind this test technique is that the EMD sample is dissolved in hydrochloric acid and the potassium level is determined by flame atomic absorption spectroscopy (FAAS) at 766.5 nm. Because the atomic absorption response to the potassium concentration is affected by the manganese concentration, manganese is added to the standards used in calibrating the instrument. In this test, there are three potential interferences that may skew the results obtained using this technique. The first of these interferences is that potassium is partially ionized in an air-acetylene flame. The effects of ionization may be substantially overcome by adding another alkali (1000 to 2000 µg/ml) to samples and standards. A second interference is that manganese concentrations above 500 ppm suppress the potassium signal. Hydrochloric acid concentrations above 0.25% also suppress the signal. In this test, an impact bead should be used in the AAS burner assembly for increased sensitivity.

The equipment used in this technique includes an atomic absorption spectrophotometer (AAS) equipped with background correction and burner assembly with impact bead; volumetric flasks of 1000 ml, 500 ml, 250 ml, 200 ml, and 100 ml; pipettes of 0.00 ml, 10.00 ml, and 2.00 ml; burettes of 50 ml and 25 ml; Carboy-Nalgene, 5½ gallon, ith spigot—1998 Fisher Scientific Catalog #02 963 BB; fume hood; beakers of 150 ml; and atch glasses to fit the 150 ml beakers.

Additionally, the following reagents are used in this technique:

1. De-ionized water. Fill a 5½ gallon-Nalgene carboy with de-ionized water and let it adjust overnight to room temperature. Use this water to dilute all samples and standards. Also, allow other solutions for sample preparation/measurement to adjust to the same temperature by placing them in proximity to this source of de-ionized water, preferably hours before use.
2. Hydrochloric acid—concentrated, reagent grade.
3. Sodium-Chloride Buffer Solution, 15,000 µg/ml—allot 38.13 grams of an ACS or finer grade of sodium chloride (NaCl) to a 1000-ml volumetric flask. Allow mixture of NaCl and water to adjust to room temperature, then dilute to the mark with de-ionized water and mix well. Reserve for dispensing with a 50-ml burette.
4. Manganese Matrix Match Solution—Dissolve 34.1499 grams of manganese (II) chloride ($MnCl_2 \cdot 4\ H_2O$), Puratronic grade from Alfa, Stock #10804 in de-ionized water and quantitatively transfer the solution to a 100-ml volumetric flask. Dilute to the mark with de-ionized water.
5. 1000 µg/ml Potassium Reference Solution—Fisher Scientific Catalog #PLK2-2X. Solute: Potassium Chloride. Solvent: Distilled Water.
6. 10.00 µg/ml Potassium Stock Solution—Pipette 10 mls from the 1000 µg/ml potassium reference solution into a 1000-ml volumetric flask. Dilute to the mark with de-ionized water and mix well. Reserve for dispensing with a 50-ml burette.
7. 2.00 µg/ml Potassium Stock Solution—Dispense 50 mls from the 10.00 µg/ml potassium stock solution into a 250-ml volumetric flask. Dilute to the mark with de-ionized water and mix well.

The following range of working standards are prepared with the following concentrations, as needed:

1. 2.00 µg/ml Potassium—Dispense 40 ml of the 10.00 µg/ml stock potassium solution into a 200-ml volumetric flask. Add 20 ml of the sodium chloride buffer solution and 2 ml of the manganese matrix match solution. Dilute to the mark with de-ionized water and mix well.
2. 1.50 µg/ml Potassium—Dispense 30 ml of the 10.00 µg/ml potassium stock solution into a 200-ml volumetric flask. Add 20 ml of the sodium chloride buffer solution and 2 ml of the manganese matrix match solution. Dilute to the mark with de-ionized water and mix well.
3. 1.00 µg/ml Potassium—Dispense 20 ml from the 10.00 µg/ml potassium stock solution into a 200-ml volumetric flask. Add 20 ml of the sodium chloride buffer solution and 2 ml of the manganese matrix match solution. Dilute to the mark with de-ionized water and mix well.
4. 0.50 µg/ml Potassium—Dispense 10 ml from the 10.00 µg/ml potassium stock solution into a 200-ml volumetric flask. Add 20 ml of the sodium chloride buffer solution and 2 ml of the manganese matrix match solution. Dilute the mark with de-ionized water and mix well.
5. 0.25 µg/ml Potassium—Dispense 25 ml of the 2.00 µg/ml potassium stock solution into a 200-ml volumetric flask. Add 20 ml of the sodium chloride buffer solution and 2 ml of the manganese matrix match solution. Dilute to the mark with de-ionized water and mix well.
6. 0.10 µg/ml Potassium—Dispense 10 ml of the 2.00 µg/ml potassium stock solution into a 200-ml volumetric flask. Add 20 ml of the sodium chloride buffer solution and 2 ml of the manganese matrix match solution. Dilute to the mark with de-ionized water and mix well.
7. 0.05 µg/ml Potassium—Dispense 5 ml of the 2.00 µg/ml potassium stock solution into a 200 ml volumetric flask. Add 20 ml of the sodium chloride buffer solution and 2 ml of the manganese matrix match solution. Dilute to the mark with de-ionized water and mix well.

The procedure includes the following steps:

1. Determine (by weight loss after 4 hours at 120° C.) the moisture on approximately 10 grams of the EMD sample and use this value in calculating the potassium concentration.
2. Weigh 3.0000 grams of the EMD sample, place into a 150-ml beaker, and cover with a watch glass. Transfer to a fume hood and add 15 mls of concentrated hydrochloric acid slowly down the side walls of the beaker. Allow it to stand until foaming subsides; swirl gently from time to time until the mixture reacts only mildly.
3. Transfer a second 150-ml beaker to the fume hood and add 15 mls of hydrochloric acid and 20 mls of the manganese matrix match solution. Cover the beaker with a watch glass. This is a reagent blank and should be carried through the entire procedure.
4. Place the EMD sample and reagent blank on a hot plate and heat slowly until the EMD sample solution clears and $MnO_2$ has dissolved completely. Heat the reagent blank until the HCl volume is reduced to less than 4 mls. Remove both from the hot plate and allow them to cool for at least 5 minutes. Then rinse watch glasses and side walls of the beakers with de-ionized water from a wash bottle. Replace the watch glasses and swirl contents gently. Adjust the volume of solution in the beakers to about 75 mls with de-ionized water and let cool to room temperature.
5. Filter the sample and reagent blank, with the aid of a clean stirring rod, through 540-Whatman filter paper into separate 200-ml volumetric flasks. Wash the filters/residues with de-ionized water from a wash bottle at least ten times, allowing the filters to drain after each washing. Dilute to the mark with de-ionized water. Mix well.
6. Pipette 10.00 ml of the EMD sample and the blank into separate 100-ml volumetric flasks. Add 10 ml of the sodium chloride buffer solution to each and dilute to the mark with de-ionized water and mix well.
7. Peak the wavelength on the AA spectrophotometer near 766.5 nm, with the slit set at an opening of 1.4 nm. Install an impact bead in burner assembly. Aspirate standards 1 through 7 into an oxidizing (lean, blue) flame, followed by the reagent blank and the EMD samples from step 6.
8. Construct a calibration graph of absorbance versus concentration of standards in (µg/ml K) on linear graph paper. Read each sample concentration from the graph in (µg/ml) for each corresponding absorbance value. Insert the concentration value (µg/ml) in the equation below for calculations of the potassium impurity levels of the EMD samples.

It should be noted that if any sample reading is above the highest standard (i.e., the 2.00 mg/ml potassium working standard), dilute it to bring it in the proper range. However, a new set of standards must be prepared which contains the proper amount of manganese. If any sample reading is below the lowest standard (i.e., the 0.05 potassium working standard), this method cannot be used to analyze the sample. Calculations:

Adjusted Sample Wt.=Actual Sample Wt.(Step 2)×[(100%−% moisture)÷100]   1.

Corrected µg/ml K for sample=µg/ml K for sample−mg/ml K for reagent blank   2.

$$\text{Potassium, ppm} = \frac{\text{Corrected µg/ml K} \times 100 \text{ ml} \times (200 \text{ ml} \div 10 \text{ ml})}{\text{Adjusted Sample Wt., grams}}$$   3.

4. Technique for Measuring Potassium Impurity Levels of EMD Retrieved from a Completed Cell In measuring the potassium impurity levels in EMD removed from a completed cell, the most significant obstacle is to develop a technique that avoids interference from potassium present as KOH in the electrolyte. In general, the KOH electrolyte is absorbed on the surface of the EMD particles. The potassium in the KOH electrolyte, however, does not penetrate to the center of the EMD particles. Thus, this technique exposes the centers of the EMD particles so as to allow the potassium impurity levels of the EMD to be determined as it existed at the time the cell was initially constructed.

In order to eliminate the interference of potassium from the KOH electrolyte absorbed on the surface of the EMD particles, electron probe microchemical analysis (EPMA) is used to measure the potassium concentration in the center of individual EMD particles. This is accomplished by focusing an electron beam onto the polished cross section of EMD powder particles and measuring the intensity of potassium X-rays emitted from the sample. Since the size of the analytical volume for EPMA is extremely small (~1 to 10 $\mu m^3$), only the potassium in the center of the particle is measured. By avoiding the surface of the EMD particles during the analysis, KOH absorbed on the surface of the particles is not measured.

To prepare the sample for use in the EPMA analysis, the cathode material is removed from an alkaline cell and rinsed in de-ionized to remove the majority of the KOH electrolyte. The rinsed cathode is then dried and mounted in an epoxy resin. The epoxy-mounted cathode is then polished by conventional metallographic techniques through 0.05 $\mu m$ grit. This procedure results in flat, polished cross sections of the EMD powder particles. The polished surface is then coated with a 10 nm layer of carbon to provide a conductive path for the electron beam used in the EPMA measurements.

To measure the potassium level using EPMA, the sample is bombarded with an electron probe with a diameter of approximately 1 $\mu m$. The interaction between the electron probe and the sample results in the emission of X-rays that have energies that are dependent upon the elements present in the sample. The intensity of the X-rays are then measured and related to the elemental concentration of the sample. Due to the small size of the electron probe, the analytical volume is ~1 to 10 m³ using this technique. This extremely small analytical volume allows for the quantification of elemental concentration on a micron scale.

Prior to measuring unknown concentrations of potassium in EMD samples, the system is first calibrated using EMD with a known concentration. Specifically, a flat polished piece of EMD plate with a known potassium concentration of 319 ppm was analyzed in the EPMA for calibration purposes. The intensity of potassium X-rays emitted from the sample was measured and stored. The analytical conditions used to calibrate the instrument with this standard are listed below:

| | |
|---|---|
| Count Time | 60 s |
| Probe current | 50 nA |
| Electron energy | 20 keV |
| Carbon coating | 10 nm |
| Potassium concentration in standard | 319 ppm |

Using this standard in these analytical conditions, a theoretical limit of detection for potassium in EMD of 4 ppm was obtained. This limit of detection can be reduced by increasing the counting time of the analysis.

To determine the concentration of potassium in an unknown EMD sample, the sample is analyzed using the analytical conditions listed above. The intensity of potassium X-rays emitted from the unknown sample is then compared to the intensity of X-rays emitted from the calibration sample, and the concentration of potassium in the unknown EMD is calculated. Utilizing the analytical conditions in the sample preparation described above, any laboratory with EPMA capabilities should be able to duplicate this analysis.

To validate this technique, a control experiment was performed where potassium was measured in EMD powder removed from an alkaline cell. The measured concentration was compared to the known potassium concentration in the EMD powder used in the cell. In this control experiment, the known potassium concentration present in the EMD powder was 260 ppm. The concentration of potassium in the EMD removed from the cell was found to be 250 ppm±5 ppm by the EPMA technique. The measured value and known value agreed within the experimental error of this technique, which indicates that the EPMA technique is a valid method for measuring the inherent potassium concentration in EMD removed from alkaline cells.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An electrode for an electrochemical cell comprising electrolytic manganese dioxide having a pH-voltage of at least about 0.860 volt, wherein said electrolytic manganese dioxide has less than about 200 ppm of potassium impurities, by weight.

2. The electrode as defined in claim 1, wherein said electrolytic manganese dioxide has a pH-voltage of at least about 0.870 volt.

3. The electrode as defined in claim 1, wherein said electrolytic manganese dioxide has less than about 150 ppm of potassium impurities by weight.

4. The electrode as defined in claim 1, wherein said electrolytic manganese dioxide has less than about 75 ppm of potassium impurities by weight.

5. The electrode as defined in claim 1, wherein said electrolytic manganese dioxide has less than about 30 ppm of potassium impurities by weight.

6. The electrode as defined in claim 1 and further including a conductive agent.

7. An electrochemical cell comprising a negative electrode, an electrolyte, and a positive electrode comprising electrolytic manganese dioxide having a pH-voltage of at least about 0.860 volt, wherein said electrolytic manganese dioxide has less than about 200 ppm of potassium impurities, by weight.

8. The electrochemical cell as defined in claim 7, wherein said electrolytic manganese dioxide has a pH-voltage of at least about 0.870 volt.

9. The electrochemical cell as defined in claim 7, wherein said electrolytic manganese dioxide has less than about 150 ppm of potassium impurities by weight.

10. The electrochemical cell as defined in claim 7, wherein said electrolytic manganese dioxide has less than about 75 ppm of potassium impurities by weight.

11. The electrochemical cell as defined in claim 7, wherein said electrolytic manganese dioxide has less than about 30 ppm of potassium impurities by weight.

12. The electrochemical cell as defined in claim 7, wherein said positive electrode further includes a conductive agent.

13. The electrochemical cell as defined in claim 7, wherein said negative electrode comprises zinc or an alloy including zinc.

14. The electrochemical cell as defined in claim 7, wherein said negative electrode comprises zinc and said electrolyte comprises potassium hydroxide.

15. The electrochemical cell as defined in claim 14, wherein said electrolytic manganese dioxide has less than about 30 ppm of potassium impurities by weight.

16. An electrode for an electrochemical cell comprising electrolytic manganese dioxide having less than about 30 ppm of potassium impurities by weight.

17. An electrochemical cell comprising a negative electrode, an electrolyte, and a positive electrode comprising electrolytic manganese dioxide having less than about 30 ppm of potassium impurities by weight.

* * * * *